3,368,868
METHOD OF INHIBITING DECOMPOSITION OF TRIAMMONIUM NITRIDOTRISULFATE
Noriyuki Okuda, Tokyo, and Kikuji Suzuki, Funabashi, Japan, assignors to Daiichi Seiyaku Co., Ltd., Tokyo, Japan
No Drawing. Filed Aug. 6, 1963, Ser. No. 300,159
1 Claim. (Cl. 23—114)

The present invention relates to a method of inhibiting decomposiiton of triammonium nitridotrisulfate.

The principal object of the present invention is to provide a method for stabilizing the unstable triammonium nitridotrisulfate.

Other objects, features and advantages of the present invention will be apparent from the following description of the invention.

Triammonium nitridotrisulfate is a compound of which the utility has recently been developed in various industries, for example, it has been utilized for the synthesis of an artificial sweetening agent, cyclohexanesulfamate, since it can be reacted with an aliphatic amine to produce a N-substituted sulfonic acid quantitatively (United States Patent 3,043,864).

Though this compound is obtained in a small amount by the reaction between ammonia and sulfuric anhydride in a gaseous phase (Kogyo Kagaku Zasshi, Japan, 60, 1262), it can be obtained more easily and purely by the reaction between nitrite and ammonium bisulfite in an aqueous phase. However, this compound is hydrolyzed so easily that the preservation thereof is difficult even in a state of pure crystal. On the other hand, the crystal can be preserved for a long time by keeping it in a container substituted by ammonia for air therein (Kogyo Kagaku Zasshi, Japan, 59, 148). Thus, there are various troubles in the industrial use of the wet triammonium nitridotrisulfate which is obtained by the reaction in an aqueous phase.

The present inventors have executed numerous experiments and laborious studies on the decomposition of wet triammonium nitridotrisulfate, and found that the compound was also hydrolyzed slowly even in an ammoniacal alkaline condition, and if free ammonia adhered to the crystals has been neutralized, the hydrolysis of the compound proceeded rapidly with heat generation.

The decomposition reaction of triammonium nitridotrisulfate is shown as follows.

$$N(SO_3NH_4)_3 + H_2O = NH(SO_3NH_4)_2 + NH_4HSO_4$$

The present inventors have sought for a method of inhiibting decomposition of triammonium nitridotrisulfate, and have found that the addition of an adequate amount of triammonium imidodisulfate to triammonium nitridotrisulfate inhibits the decomposition of the latter compound sufficiently, the mixture having only faint ammonia-odor.

The stabilities of the mixtures composed in various ratio of triammonium nitridotrisulfate containing 3% of water which is taken out from a centrifugal hydroextractor and of triammonium imidodisulfate are shown in the following tables.

TABLE 1
Stability test (at 20° C.)

| Ratio of triammonium imidodisulfate added | Decomposition rate of triammonium nitridotrisulfate after 10 days | Days required for the whole decomposition |
| --- | --- | --- |
| 2.5% | 1.05% | 23 |
| 5% | 0.98% | 46 |
| 10% | 0.65% | >100 |
| 15% | 0.30% | >100 |
| 20% | 0.30% | >100 |
| Non-addition | | 2 |

TABLE 2
Stability test (at 37° C.)

| Ratio of triammonium imidodisulfate added | Decomposition rate of triammonium nitridotrisulfate after 10 days | Days required for the whole decomposition |
| --- | --- | --- |
| 10% | 5.7% | 13 |
| 15% | 4.3% | 30 |
| 20% | 2.3% | >100 |
| Non-addition | | 1 |

As both triammonium nitridotrisulfate and triammonium imidodisulfate give the same product when reacted with cyclohexylamine, there is no problem in the reaction to use the mixture obtained in this way if they are composed of the above-mentioned compounds in any ratio. (Yakugaku Zasshi, Japan, 61, 1531, 1535). As shown above, there are many cases to give the same product from both triammonium nitridotrisulfate and triammonium imidodisulfate by the reaction with some materials, so that triammonium imidodisulfate in the mixture is not regarded as undesirable impurity in the reaction.

Thus, it may be considered advantageous to admix triammonium nitridotrisulfate with triammonium imidodisulfate.

This invention is characterized in that the unstable triamomnium nitridotrisulfate is stabilized by admixing triammonium imidodisulfate with said triammonium nitridotrisulfate. The resulting mixture has only faint ammonia-odor, and can be handled easily, and moreover, it may be used as such in the chemical reaction as a starting material.

What we claim is:

1. A method of inhibiting the decomposition of wet triammonium nitridotrisulfate obtained by reaction in an aqueous phase which comprises admixing an effective inhibiting amount of triammonium imidodisulfate with said wet triammonium nitridotrisulfate.

References Cited

FOREIGN PATENTS
647,316  12/1950  Great Britain.
674,810   7/1950  Great Britain.

OTHER REFERENCES
Brasted, "Comprehensive Inorganic Chemistry," D. Van Nostrand Company, Inc., N.Y. vol. 8, 1961, pp. 231 and 232.

EARL C. THOMAS, *Primary Examiner.*